US011479512B2

(12) United States Patent
Rahme et al.

(10) Patent No.: US 11,479,512 B2
(45) Date of Patent: Oct. 25, 2022

(54) PROCESS AND APPARATUS FOR PRODUCING A SHAPED ARTICLE

(71) Applicant: Nu-Rock Corporation S.A.R.L., Beirut (LB)

(72) Inventors: Maroun George Rahme, Breakfast Point (AU); George Maroun Rahme, Sr., Beirut (LB); George Maroun Rahme, Jr., Breakfast Point (AU); Benjamin Maroun Rahme, Breakfast Point (AU); Daniel Maroun Rahme, Breakfast Point (AU)

(73) Assignee: NU-ROCK CORPORATION S.A.R.L., Beirut (LB)

( * ) Notice: Subject to any disclaimer, the term of this patent is extended or adjusted under 35 U.S.C. 154(b) by 0 days.

(21) Appl. No.: 16/472,809

(22) PCT Filed: Dec. 21, 2017

(86) PCT No.: PCT/AU2017/051441
§ 371 (c)(1),
(2) Date: Jun. 21, 2019

(87) PCT Pub. No.: WO2018/112547
PCT Pub. Date: Jun. 28, 2018

(65) Prior Publication Data
US 2020/0189984 A1  Jun. 18, 2020

Related U.S. Application Data

(60) Provisional application No. 62/438,813, filed on Dec. 23, 2016.

(51) Int. Cl.
*C04B 18/06* (2006.01)
*C04B 18/14* (2006.01)
(Continued)

(52) U.S. Cl.
CPC ............. *C04B 40/0046* (2013.01); *B01J 2/00* (2013.01); *C04B 18/06* (2013.01); *C04B 18/12* (2013.01);
(Continued)

(58) Field of Classification Search
CPC ..... C04B 22/06; C04B 22/002; C04B 22/062; C04B 18/12; C04B 18/14; C04B 18/06;
(Continued)

(56) References Cited

U.S. PATENT DOCUMENTS 4,116,705 A * 9/1978 Chappell ................. C04B 28/04
588/256
5,372,640 A * 12/1994 Schwarz ................... C04B 7/38
106/713
(Continued)

FOREIGN PATENT DOCUMENTS

DE  37 16 444 A  12/1988
DE  195 36 124 A1  4/1997
(Continued)

OTHER PUBLICATIONS

Australian Patent Office/ISA, Written Opinion of the International Searching Authority for PCT Application No. PCT/AU2017/051441, dated Mar. 9, 2018. 4 pages.
(Continued)

*Primary Examiner* — Seyed Masoud Malekzadeh
(74) *Attorney, Agent, or Firm* — SoCal IP Law Group LLP; Brian Tamsut (57) ABSTRACT

Disclosed herein is a method and an apparatus for producing a shaped article. The method comprises obtaining a freshly produced aluminosilicate-containing particulate waste material and, before the waste material cools to ambient temperature, mixing the waste material into a mixture, wherein the mixture comprises the aluminosilicate, a metal oxide, an
(Continued)

alkali, a water soluble silicate and water; shaping the mixture; and curing the shaped mixture, whereby the shaped article is produced.

22 Claims, 2 Drawing Sheets (51) Int. Cl.
    *C04B 22/06*     (2006.01)
    *C04B 28/26*     (2006.01)
    *B01J 2/00*     (2006.01)
    *C04B 40/00*     (2006.01)
    *C04B 18/12*     (2006.01)
    *C04B 111/00*     (2006.01)

(52) U.S. Cl.
    CPC ............. *C04B 18/14* (2013.01); *C04B 22/06* (2013.01); *C04B 28/26* (2013.01); *C04B 2111/00474* (2013.01)

(58) Field of Classification Search
    CPC ... C04B 18/10; C04B 18/0409; C04B 18/162; C04B 40/0046; C04B 20/0016; C04B 28/26; C04B 14/308; C04B 2111/00474; C04B 2290/20; C04B 18/106; B01J 2/00
    See application file for complete search history.

(56) References Cited

U.S. PATENT DOCUMENTS

| | | | |
|---|---|---|---|
| 5,601,643 A * | 2/1997 | Silverstrim | C04B 28/26 106/606 |
| 5,718,857 A | 2/1998 | Howlett | |
| 5,988,864 A | 11/1999 | Bracegirdle | |
| 6,416,572 B1 * | 7/2002 | Eldemallawy | C04B 28/26 106/38.22 |
| 7,666,505 B2 | 2/2010 | Datta et al. | |
| 7,691,198 B2 * | 4/2010 | Van Deventer | B28C 7/0418 106/737 |
| 8,815,133 B2 | 8/2014 | Mak et al. | |
| 9,090,508 B2 | 7/2015 | Gong et al. | |
| 9,242,900 B2 * | 1/2016 | Seo | C04B 28/006 |
| 9,802,865 B1 * | 10/2017 | Chau | C04B 22/06 |
| 2007/0023551 A1 | 2/2007 | Aichinger | |
| 2008/0264066 A1 | 10/2008 | Porat et al. | |
| 2008/0264301 A1 * | 10/2008 | Porat | C04B 7/24 106/668 |
| 2008/0196800 A1 | 12/2008 | Howard | |
| 2009/0071374 A1 * | 3/2009 | Van Deventer | B28C 7/12 106/668 |
| 2009/0156725 A1 | 6/2009 | Hampton | |
| 2010/0018142 A1 * | 1/2010 | Schouren | C08J 9/224 52/309.4 |
| 2013/0055924 A1 * | 3/2013 | Seo | C04B 12/005 264/49 |
| 2014/0047999 A1 | 2/2014 | Razl | |
| 2014/0227508 A1 * | 8/2014 | Schootstra | C09J 109/08 428/317.5 |
| 2015/0060720 A1 * | 3/2015 | Feige | C04B 40/0042 252/62 |
| 2015/0258552 A1 | 9/2015 | Warkentin et al. | |
| 2016/0061806 A1 | 3/2016 | Reid et al. | |
| 2017/0226008 A1 * | 8/2017 | Daniellou | C04B 20/04 |
| 2017/0233291 A1 * | 8/2017 | Sevagen | C04B 18/101 106/710 |

FOREIGN PATENT DOCUMENTS

| | | |
|---|---|---|
| DE | 203 17 608 U1 | 3/2004 |
| WO | 89/12498 A1 | 12/1989 |
| WO | 1992/022514 A1 | 12/1992 |
| WO | 1994/013450 A1 | 6/1994 |
| WO | 2000/075384 A1 | 12/2000 |
| WO | 2018/112547 A1 | 6/2018 |

OTHER PUBLICATIONS

Australian Patent Office/ISA, International Search Report for PCT Application No. PCT/AU2017/051441, dated Mar. 9, 2018. 5 pages.
European Patent Office, Extended European Search Report for EP Application No. 17884435.3, dated Aug. 18, 2020. 12 pages.

* cited by examiner

PROCESS AND APPARATUS FOR PRODUCING A SHAPED ARTICLE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

This application claims priority to International PCT Application No. PCT/AU2017/051441, filed Dec. 21, 2017, entitled "PROCESS AND APPARATUS FOR PRODUCING A SHAPED ARTICLE" which claims priority to U.S. Provisional Patent Application No. 62/438,813 filed Dec. 23, 2016, the disclosures and figures of which are incorporated by reference as if set forth herein in their entirety.

TECHNICAL FIELD

The present invention relates to processes and apparatus for producing shaped articles from a waste material. In a particular form, the present invention relates to processes and apparatus for producing shaped articles using ash generated by the combustion of substances such as coal.

BACKGROUND ART

The combustion of fossil fuels for the production of electricity (e.g. in power stations) and heat (e.g. in smelters) results in the production of a number of pollutants. In coal-fired power stations, for example, the combustion of coal produces waste materials including fly ash (the fine ash particles which become entrained in the flue gas) and bottom ash (the heavier ash which falls to the bottom of the boiler). In order to comply with environmental requirements, these ashes cannot be discharged into the environment, but must be collected for subsequent disposal or recycling.

Waste materials such as fly ash can be recycled, for example, by being used in hydraulic cements or plasters as a replacement or partial replacement for Portland cement in concrete production. Due to the relative expense of Portland cement, incorporating fly ash into a cementitious material can provide substantial cost savings. Such recycling is beneficial not only in that less fly ash requires disposal (e.g. into landfill), but in that a waste product has been given a beneficial reuse.

Many attempts have been made to produce cementitious materials that consist essentially of fly ash (i.e. which contain no, or very little, Portland cement). However, the vast majority of these cementitious materials have been unsuitable for a variety of reasons, including a lack of sufficient compressive strength, resistance to acid attack or longevity. One cementitious material that does have suitable structural properties, despite containing no Portland cement, is described in U.S. Pat. No. 5,718,857. In this cementitious material (referred to as a "solid aggregate material"), an aluminosilicate containing non-soil or waste material is mixed with iron oxide, an alkali, a water soluble silicate, water and optional additives, formed into a cohesive mass and cured. The resultant shaped articles (that have been used as, for example, construction bricks, roof tiles, tiles, blocks, pipes, roads, culverts, mine back fill material, shotcreting material, tailing dam capping, road embankment stabilisers, etc.) were found to have an excellent compressive strength, durability and resistance to degrading over time.

It would be advantageous to improve the efficiency of production of such articles.

SUMMARY OF INVENTION

In a first aspect, the present invention provides a process for producing a shaped article. The process comprises:
  obtaining a freshly produced aluminosilicate-containing particulate waste material and, before the waste material cools to ambient temperature, mixing the waste material into a mixture, wherein the mixture comprises the aluminosilicate, a metal oxide, an alkali, a water soluble silicate and water;
  shaping the mixture; and
  curing the shaped mixture, whereby the shaped article is produced.

The inventors have surprisingly and unexpectedly discovered that if the aluminosilicate-containing particulate waste material used to produce the shaped article is not allowed to cool down to ambient temperature before mixing, then its reactivity is greatly increased. The inventors have found that such an increased reactivity can significantly (by up to 50%) reduce the amounts of the other components (i.e. the metal oxide, alkali and water soluble silicate) that are required in order to form shaped articles having comparable physical properties to those obtained using the process described in U.S. Pat. No. 5,718,857. The inventors have also found that the present invention may require shorter mixing and curing times (i.e. compared to U.S. Pat. No. 5,718,857), both of which may help to further improve the production efficiency of the shaped articles. Without wishing to be bound by theory, the inventors believe that a crust forms around the particles of waste materials once they have cooled and, once such a crust has formed, the reactivity of the particle, and the aluminosilicate minerals contained therein, is significantly decreased.

In some embodiments, the freshly produced aluminosilicate-containing particulate waste material is conveyed (e.g. pneumatically conveyed) directly from a source of production of the waste material. In some embodiments, heating during conveyance of the waste material may be used to slow down the rate of cooling of the waste material during conveyance. For example, a hot gas may be used to pneumatically convey the waste material (with the hot gas optionally subsequently being beneficially used in the process of the present invention, for example, to heat the shaped mixture during curing).

As will be described in further detail below, the inventors have also discovered that a number of synergies can be achieved if the process of the present invention is performed in close proximity (e.g. on site) to the source of production of the waste material. In effect, the present invention and the source of production of the waste material form a symbiotic type relationship, where the present invention converts waste from the source (which would otherwise need to be disposed) into a beneficial product.

Thus, the process of the present invention would ideally be conducted in close proximity to the source of production of the waste material. In such embodiments, at least some of any heat required by the process may be provided by the source of production of the waste material. As would be appreciated, it is often necessary for power plants (and the like) to use large quantities of cooling water in order to maintain a temperature within the plant. The present invention may be able to beneficially use the heat of that water, which would reduce its temperature and beneficially improve the efficiency of the plant's boiler process to generate power. The cost-efficiencies and advantages of such synergy are immediately apparent.

In some embodiments, freshly produced aluminosilicate-containing particulate waste material having different particle sizes may be obtained and mixed. Use of such differently sized particulate waste materials can impart beneficial properties to the resultant shaped article, or require the use of less other components. For example, fly ash (fine particles) and bottom ash (coarser particles) can be mixed in order to form a concrete-like material.

In some embodiments, the water for the mixture may be obtained from the source of production of the waste material. For example, power plants produce a large quantity of brine during operation, which would usually need to be separately disposed in an environmentally compliant manner (e.g. in a holding dam, where evaporation reduces its volume). However, in the present invention, this brine can instead be beneficially used (i.e. in addition to the particulate waste material) to form the shaped article, thus even further increasing the synergy described above between the present invention and a power plant, or the like.

In some embodiments, the aluminosilicate-containing particulate waste material may itself include a source of a metal oxide, alkali and/or water soluble silicate. In such embodiments, the quantity of additional metal oxide, alkali and/or water soluble silicate required for the mixture would be reduced, possibly even to zero.

In some embodiments, the mixture consists only of the waste material the metal oxide, the alkali, the water soluble silicate and water. Alternatively, in some embodiments, additional additives such as appropriately graded quarry waste gravels, waste sands, pigments, waste bauxite, waste silica fumes, limestone fines, igneous and volcanic rock fines and calcined soils may also be added to the mixture. Usually, such additives would be included in the mixture to produce a shaped article having a particularly desired texture, colour, appearance or other characteristics.

In some embodiments, the mixture may further comprise washery tailings and the shaped article is provided in the form of pellets. The inventors have found that such pellets have a relatively high carbon content and properties not dissimilar to that of biochar, making them especially suitable for mixing with phosphate or urea prills for use as fertilizers.

In a second aspect, the present invention provides an apparatus for producing a shaped article. The apparatus comprises:
  an inlet configured to receive a still-warm freshly produced aluminosilicate-containing particulate waste material;
  a conveyor configured to convey the freshly produced aluminosilicate-containing particulate waste material from a source of production of the waste material to the inlet before the waste material cools to ambient temperature;
  a mixer for mixing the still-warm particulate waste material into a mixture, wherein the mixture comprises the aluminosilicate, a metal oxide, an alkali, a water soluble silicate and water;
  a shaper for shaping the mixture; and
  a curer for curing the shaped mixture to produce the shaped article.

In some embodiments, the conveyor is a pneumatic conveyor. In some of such embodiments, a hot gas may be used to convey the freshly produced aluminosilicate-containing particulate waste material, which slows down its rate of cooling. In such embodiments, the apparatus may further comprise ducting which directs the hot gas from the inlet to the curer (or any other part of the apparatus that requires heating).

As described above in the context of the process of the present invention, numerous advantages and synergies are obtainable if the apparatus of the present invention is located in close proximity to the source of production of the waste material. In particular, as a shorter distance needs to be traversed by the freshly produced aluminosilicate-containing particulate waste material before it reaches the inlet, there is less likelihood of the particles cooling and crust formation occurring. As would also be appreciated, however, given the volume of such waste material that would typically be produced, the closer the apparatus to the source of the waste material, the less equipment required to convey the waste material to the apparatus and the less energy intensive the process. Additional potential advantages and synergies are described below.

In some embodiments, for example, at least some of any heat required by the apparatus is provided by the source of production of the waste material. In such embodiments, the apparatus may further comprise heat exchangers which exchange heat from cooling water (or elsewhere) from the source of production of the waste material.

In some embodiments, for example, at least some of the water required by the apparatus may be provided by the source of production of the waste material. In such embodiments, the apparatus may further comprise conduits via which water for the mixer is obtainable from waste water from the source of production of the waste material.

In some embodiments, the apparatus of the present invention may be used to perform the method of the present invention.

In the present invention, the source of production of the waste material may, for example, be a power station, such as a coal-fired power station, a steel mill, a non-ferrous metal smelter, an alumina plant, an incinerator or a biogenerator.

In the present invention, the freshly produced aluminosilicate-containing particulate waste material may, for example, be selected from one or more of the following: power station ashes; coal-fired power station ashes, including run of station ash, fly ash and bottom ash; steel mill wastes; non-ferrous metal smelter wastes; red mud from alumina plants; incinerator ashes; and ashes from biogeneration foundries and boilers.

In the present invention, the shaped article may have any appropriate size and may, for example, be a building brick, a masonry block, a tile (e.g. a roof tile or a floor tile), a paver, a panel, a pipe, a plasterboard (e.g. a fire rated and/or water proof board) or a sheet product. Smaller sized shaped articles are also contemplated, such as aggregate materials (e.g. for use in concrete or asphalt) or sands (e.g. frac, mortar or render sands). Other, non-construction related, shaped articles may include pellets (e.g. the fertiliser pellets described herein), prills, etc.

In a third aspect, the present invention provides a shaped article produced by the method or apparatus of the present invention.

In a fourth aspect, the present invention provides uses of the shaped article produced by the method or apparatus of the present invention. Specific uses of the shaped articles are described herein, with many relating to the construction or agriculture industries. Other potential uses would, however, be readily apparent to a person skilled in the art.

In a fifth aspect, the present invention provides a method for reducing a quantity of material (e.g. fly ash, polluted water, etc.) required to be disposed by a source of production of an aluminosilicate-containing particulate waste material (e.g. a coal-fired power station), by operating the process or apparatus of the present invention in conjunction with the source.

In a sixth aspect, the present invention provides a method for reducing a temperature of cooling water of a source of production of an aluminosilicate-containing particulate waste material (e.g. a coal-fired power station), comprising the step of stripping heat from the cooling water via heat exchange during operation of the process or apparatus of the present invention in conjunction with the source.

Other aspects, features and advantages of the present invention will be described below.

BRIEF DESCRIPTION OF THE DRAWINGS

The present invention will be described in further detail below with reference to the following figures, in which.

DETAILED DESCRIPTION OF THE INVENTION

As noted above, the present invention provides a method and an apparatus for producing a shaped article. The method comprises:

- obtaining a freshly produced aluminosilicate-containing particulate waste material and, before the waste material cools to ambient temperature, mixing the waste material into a mixture, wherein the mixture comprises the aluminosilicate, a metal oxide, an alkali, a water soluble silicate and water;
- shaping the mixture; and
- curing the shaped mixture, whereby the shaped article is produced.

The apparatus comprises:

- an inlet configured to receive a still-warm freshly produced aluminosilicate-containing particulate waste material;
- a conveyor configured to convey the freshly produced aluminosilicate-containing particulate waste material from a source of production of the waste material to the inlet before the waste material cools to ambient temperature;
- a mixer for mixing the still-warm particulate waste material into a mixture, wherein the mixture comprises the aluminosilicate, a metal oxide, an alkali, a water soluble silicate and water;
- a shaper for shaping the mixture; and
- a curer for curing the shaped mixture to produce the shaped article.

The present invention advantageously utilises what would otherwise be a waste material to produce a shaped article for potential reuse. Given the pozzolanic properties of aluminosilicate-containing particulate waste materials, the shaped article would often be produced for use in the construction industry. In some embodiments, for example, the shaped article may be produced in the form of a building brick, a masonry block, a tile (e.g. a roof tile or a floor tile), a paver, a panel, a pipe, a plasterboard (e.g. a fire rated and/or water proof board), a sheet product and the like. In a particularly preferred embodiment, the present invention may provide shaped articles in the form of bricks which comply with Australian Standard AS1226-1984 for clay bricks or AS2733-1984 and the Masonry Codes AS3700, ISO9002 and ASTM C90 for concrete masonry blocks. Smaller sized shaped articles are also contemplated, such as aggregate materials (e.g. for use in concrete or asphalt) or sands (e.g. frac, mortar or render sands). In other embodiments, the shaped article may be provided in the form of pellets, prills or the like, such as the fertilizer pellets described herein. Shaped articles produced by the present invention may also find application in culverts, as mine back-fill, shotcreting material, tailing dam capping, as road embankment stabilisers, etc.

In many embodiments, the shaped article will be capable of beneficial reuse. It is to be appreciated, however, that this need not always be the case. For example, the present invention might instead be used to produce shaped articles having minimal strength, but in which the particulate waste material is sufficiently bound so as to prevent it from being blown away through wind action or leached through water action following its disposal (e.g. as landfill). In such forms, even though the waste material is not beneficially recycled, its volume is greatly reduced and there is much less chance of it escaping from its containment (i.e. within the shaped article).

The shaped articles of the present invention have been found by the inventors to have comparable physical properties to those obtained using the process described in U.S. Pat. No. 5,718,857. Specifically, shaped articles in accordance with the present invention have been found to have compressive and transverse strengths higher than those of comparable articles formed using Portland cement, as well as excellent durability (passing 40 cycles of the salt resistant test without surface deterioration) and acid resistance (being able to withstand immersion in sulphuric and hydrochloric acid for over six months with no detrimental effect to the article). The shaped articles of the present invention have also been found to be better at incorporating contaminants into their matrix (and retaining them) than is the case for Portland cement-containing articles, which is important because some waste materials may include heavy metals such as cadmium, arsenic or chromium. Furthermore, shaped articles of the present invention have been found to have a thermal rating of between 5 to 8 times higher than that of comparable articles formed using Portland cement-containing concrete or clay.

The present invention, however, provides a significantly improved process for forming these shaped articles, compared to the process described in U.S. Pat. No. 5,718,857. Specifically, the quantity of the reagents required in the present invention may be up to 50% (more typically 20-30%) lower than that required by the process of U.S. Pat. No. 5,718,857, with all of the attendant cost benefits. Furthermore, the present invention may require shorter mixing and curing times, meaning that greater amounts of product (i.e. shaped articles) can be produced. Indeed, the inventors believe that it should be possible to continuously operate the apparatus of the present invention in conjunction with a power station (or the like) in a manner whereby substantially all of the fly ash produced by the power station is used to form shaped articles before it can cool to ambient temperature, with those shaped articles often requiring only a relatively short period of time to cure before they are capable of being transported off-site.

The waste material used in the present invention includes aluminosilicate minerals, which are a class of minerals including aluminium, silicon and oxygen (plus counter cations). These aluminosilicate minerals contained in the particulate waste material are capable of reacting with the other components of the mixture in order to produce the shaped articles described herein.

The source of the waste material for use in the present invention may be any facility that produces an aluminosilicate-containing particulate waste material. Examples of such facilities include power stations, such as coal-fired power station, steel mills, non-ferrous metal smelters, alumina plants, incinerators and biogenerators. These facilities produce vast amounts of waste material suitable for use in the present invention, which would otherwise require careful disposal in order to comply with environmental regulations. Further, as recognised by the inventors, the present invention can beneficially also be used to reduce the power requirements or otherwise increase the efficiency of the facility (e.g. by stripping heat from the cooling tower water or by utilising hot gases which might otherwise have to be cooled) or utilise other waste products (i.e. in addition to the particulate waste material) such as produced brine. The inventors recognised the importance of this symbiotic-type relationship between the present invention and the source of the waste material, from both a beneficial waste reuse perspective, as well as for the further increases in efficiency that may be obtainable. For example, not only does the present invention require the waste particulate material produced by the power plant, but some of the energy requirements of the present invention can be fulfilled by waste heat or by other by-products of the power plant.

The present invention is therefore ideally conducted or located in close proximity to the source of production of the hot waste material (e.g. a coal-fired power plant). Ideally, the apparatus would be located in close proximity to the source of production of the waste material, and preferably on the same site as the source. The apparatus may, for example, be located on the same site as a power plant, with only a few hundred meters (up to about 1,000 m but preferably less than about 700 m) at most separating the apparatus and power plant (and, in particular, the source of the hot aluminosilicate-containing particulate waste material in the power plant, for example its flues). As would be appreciated, minimising the distance between the apparatus and power plant (subject, of course to other space restrictions in the power plant) would be more efficient and economical. Some of the potential synergies between the present invention and the source of the waste material are described below.

At least some of any heat required by the process or apparatus of the present invention may be provided by the source of the waste material (for example a power plant). The apparatus may, for example, have heat exchangers which strip heat from the power plant's cooling water in order to heat a component of the apparatus. Thus, the power plant does not have to supply as much (if any) energy into a cooling system for cooling that water.

The water for mixing with the other components in the mixture may also be obtained from the power station (or other source of production of the waste material). The apparatus may, for example, have conduits via which water for the mixer is obtainable from waste water from the source of production of the waste material. Such waste water is often brine (which may include other contaminants such as heavy metals) and would otherwise need to be carefully disposed of, for example in an evaporation pond. As would be appreciated, such conventional disposal methods are very land intensive and carry a number of inherent environmental risks, especially if a sludge concentrated in heavy metals or other contaminants builds up. By reducing the volume of this by-product, the present invention can therefore become even more commercially attractive—not only are many of the raw materials supplied essentially for free, but their incorporation into a shaped article which can potentially be beneficially reused reduces (and possibly even eliminates) waste products produced by the generation of power (etc.).

Furthermore, the gas used to convey the freshly produced aluminosilicate-containing particulate waste material in the pneumatic conveyor is typically a hot gas, which may be put to further beneficial use in the present invention. The apparatus may, for example, further comprise ducting which directs the hot gas from the inlet into the curer (or any other part of the apparatus which could benefit from being heated). In some embodiments, the gas may be a flue gas from the power station (etc.), in which case it is likely to be rich in carbon dioxide. The inventors have found that gasses rich in carbon dioxide can help to further accelerate the rate of curing of the shaped articles.

Furthermore, where the present invention is performed or located in close proximity to the power station (etc.), the relative costs associated with transporting the waste material, and optionally water, are lower than would be the case with conventional disposal/transport systems. In conventional systems, for example, the fly ash waste is carried to its processing facility via trucks, which necessitates an almost constant stream of trucks into and out from the power plant.

As the aluminosilicate-containing particulate waste material is produced by a combustion process, it is very hot when formed but, due to its relatively small particle size, rapidly cools. As described above, the inventors have surprisingly and unexpectedly discovered that if the waste material is not allowed to cool down to ambient temperature before mixing with the other components, then its reactivity is greatly increased than was the case for the process described in U.S. Pat. No. 5,718,857. Conveying the freshly produced, aluminosilicate-containing particulate waste material directly from its source to the mixture before the waste material can cool to ambient temperature is therefore critical to the performance of the present invention.

The time taken for the freshly produced aluminosilicate-containing particulate waste material to cool to ambient temperature depends on a number of factors, including the ambient temperature, the volume of waste material and the environment in which it is conveyed. These factors will be described in further detail below.

Any freshly produced aluminosilicate-containing particulate waste material may be used in the present invention. The freshly produced aluminosilicate-containing particulate waste material may, for example, be selected from one or more of the following: power station ashes; coal-fired power station ashes (including run of station ash, fly ash and bottom ash); steel mill wastes; non-ferrous metal smelter wastes; red mud from alumina plants; incinerator ashes; and ashes from biogeneration foundries and boilers.

In some embodiments, blends or mixtures of waste materials from different sources may be used in the present invention. For example, blends of one or more of BOF slag, steel furnace slag, dust waste from a steel furnace, ash from an incinerator, nickel, silver, lead and zinc furnace slags, red mud fines from hard rock quarries and limestone dust waste from quarries, to name a few, may be mixed with fly ash (for example) to make a high quality shaped article having good compressive strength and low water absorption.

The aluminosilicate-containing particulate waste material used in the present invention may have any appropriate particle size, or range of particle sizes. In some embodiments, it may be advantageous to use waste material having a relatively homogeneous particle size (e.g. classified graded fly ash), for example if shaped articles having ceramic-type properties are required (the small particle size of fly ash enables a very dense shaped article to be formed). Alternatively, it may be advantageous to use waste material having relatively heterogeneous particle size. For example, building bricks having appropriate strength characteristics but which are much lighter than similarly shaped blocks containing Portland cement, for example, may be formed by using a blend of fly ash and bottom ash from a coal-fired power station, with the larger sized bottom ash particles providing an aggregate-type function in the mixture. Thus, in the present invention, freshly produced aluminosilicate-containing particulate waste material having different particle sizes may be obtained and mixed. In such embodiments, the inlet of the apparatus may be configured to receive freshly produced aluminosilicate-containing particulate waste material having different particle sizes.

An amount of up to about 95% by weight of the aluminosilicate-containing particulate waste material may be included in the mixture, thereby providing for the possibility of both disposing of and utilising substantial amounts of a waste material that would otherwise have required careful disposal (and probably at cost to the producer).

In the present invention, the aluminosilicate-containing particulate waste material must have been freshly produced and must be mixed with the other components whilst still warm or still hot (i.e. before the waste material cools to ambient temperature). Thus, the waste material must be transported from its source of production to the mixture (i.e. the inlet of the apparatus of the present invention) as fast as possible. In some embodiments, the waste material is directly transported from its source of production to the mixture, but this need not always be the case (as described below).

Any method by which the waste material may be transported quickly and without a substantial loss in temperature may be used in the present invention. Ideally, the waste material may be conveyed directly from its source of production to the inlet of the apparatus, for example via a pneumatic conveyer. Pneumatic conveyors are used in the art to convey particulate materials by entraining them within a relatively strong flow of gas through the conveyor. In some embodiments, a hot gas may be used to pneumatically convey the waste material, the heat from the gas effectively slowing down the rate of cooling of the waste material during its conveyance. As described herein, the heat from the hot gas may also be put to beneficial use in the invention, for example, to heat the shaped mixture during curing. The source of the hot gas may, for example, be a flue gas generated during production of the particulate waste material.

In some power stations, fly ash is temporarily stored in a "Pop chamber" after its production. The flue gases, in which the fly ash is entrained, are fed into a chamber and stored until the pressure in the chamber reaches a predetermined value, whereupon a relief valve "pops" and the pressurised flue gas/fly ash is directed into a conduit. The pressure with which the gas mixture is directed into the conduit is typically sufficient to carry the gas mixture to its final destination which, in embodiments of the present invention, will be the inlet of the apparatus.

Notwithstanding the preference for the aluminosilicate-containing particulate waste material to be directly transferred from its source of production to the apparatus of the present invention, the produced waste material may, in some embodiments, be stored for a brief period of time, provided that the waste material does not cool to ambient temperature during any such storage. For example, storage silos may be provided with the apparatus of the present invention, with produced waste material being directed into the silos from its source for temporary storage, with still-warm waste material being collected as required for transfer to the inlet of the apparatus. The continuous flow of fresh hot gases and waste material into the silos would act to keep the waste material hot, and the silos may be insulated and/or heated where necessary.

Such storage silos may be advantageous because they can provide a buffer of waste material for use with batch-wise mixing, rather than a batch possibly having to wait until the required amount of waste material was delivered (and the delivery of fresh waste material having to be held until such time as the mixer was free again).

The temperature at which the aluminosilicate-containing particulate waste material is delivered to the mixture in the present invention will be dependent on a number of factors, primarily the nature of the waste material, the distance it must be conveyed and the environment in which it is conveyed. Ideally, the waste material will be supplied as hot as possible but, in reality, some heat loss will occur during its transport. Some waste materials may be more tolerant to cooling than others (e.g. the crust which the inventors believe is formed on cooling and which decreases the reactivity of the particles may be slower to form for some waste materials). The rate of cooling and minimum useful temperature could be relatively easily determined by a person skilled in the art based on the teachings contained herein and routine trials.

In some embodiments, the obtained freshly produced aluminosilicate-containing particulate waste material is above a temperature of about 25° C., preferably above a temperature of about 30° C., more preferably above a temperature of about 35° C., more preferably above a temperature of about 40° C., more preferably above a temperature of about 45° C., and even more preferably above a temperature of about 50° C., when it is mixed into the mixture.

In the present invention, the still-warm particulate waste material, metal oxide, alkali, water soluble silicate and water are mixed in a mixer. Any suitable mixer may be used for this purpose, bearing in mind the nature of the components (e.g. their flowability, corrosiveness, temperature, etc.) and the relatively high rate at which the waste material (and hence other components of the mixture) would be supplied.

Mixers which the inventors expect would be suitable for use in the present invention would have a capacity of up to about 10,000 litres. Such mixers are commercially available and are usually manufactured for specific applications by companies such as Maschinenfabrik Gustav Eirich GmbH & Co KG, for example. The inventors envisage that a mixer capable of mixing up to 10 tonnes continuously or in continuously batched mixes every 1 to 3 minutes would be suitable for use in commercial embodiments of the present invention.

The mixture of the present invention also includes at least a metal oxide, an alkali, a water soluble silicate and water. Given a particular aluminosilicate-containing waste material, the person skilled in the art could readily determine appropriate amounts of each of these components to produce a shaped article of a required compressive strength and having other characteristics. Each of these components will be described below.

The metal oxide is present in the mixture (the inventors believe) to react with the aluminosilicate minerals in the freshly produced aluminosilicate-containing particulate waste material such that a metal-aluminosilicate crystal structure is formed, which imparts a relatively high strength to the resultant shaped article. The amount of the metal oxide required in a specific mixture will vary depending on factors such as the nature of the waste material and desired properties of the resultant shaped articles, and can be determined by a person skilled in the art based on the teachings contained herein and routine trials. The proportion of metal oxide in the mixture may, for example, be between about 1 and 20% by weight of the total mixture. The amount of metal oxide used may be as low as about 1% by weight with respect to the aluminosilicate containing material. At levels up to about 7%, the compressive strength of the shaped article increases but above that level compressive strength remains substantially constant. The inventors have found that a reduction of about 20% of metal oxide compared to that of U.S. Pat. No. 5,718,857 is achievable in the present invention, without loss of beneficial properties.

Any metal oxide may be used, with iron oxide being preferred. In some embodiments, advantages might be attained by including two or more metal oxides in the mixture. In some embodiments, a quantity of metal oxide may be present in another component of the mixture, and it not be necessary to separately add as much (or even any further) metal oxide. For example, the aluminosilicate containing particulate waste material may comprise a material such as a flue dust, which may be high in iron oxide. Alternatively (or in addition), water obtained from the power plant (etc.) may contain an amount of a metal oxide.

The alkali is present in the mixture (the inventors believe) to react with chemical moieties on the surface of the freshly produced aluminosilicate-containing particles in order to facilitate reactions thereon such that a metal-aluminosilicate crystal structure is formed, which imparts a relatively high strength to the resultant shaped article. The amount of alkali required in a specific mixture will vary depending on factors such as those described above, and can be determined by a person skilled in the art based on the teachings contained herein and routine trials. The proportion of alkali in the mixture may, for example, be between about 0.25 and 3% by weight of the waste material. The inventors have found that a reduction of about 20% of alkali compared to that of U.S. Pat. No. 5,718,857 is achievable in the present invention, without loss of beneficial properties.

Any alkali may be used, with strong alkalis such as sodium hydroxide or potassium hydroxide being preferred. In some embodiments, advantages might be attained by including two or more alkalis in the mixture. In some embodiments, it may not be necessary to separately add an alkali to the mixture (or a lesser quantity of the alkali be required) because one of the other components in the mixture is alkaline. For example, many brine waters (e.g. from blow down water from power stations and boilers) are alkaline in nature and their use as the water in the mixture negate (or reduce) the need for separate alkali addition.

The water soluble silicate is present in the mixture (the inventors believe) to give the shaped article an appropriate green strength and to contribute to the chemical reactions that result in the shaped article hardening. The water soluble silicate also helps to impart high levels of resistance to salt and acid attack to the resultant shaped article. The proportion of water soluble silicate in the mixture is between about 1 and 3% by weight of the total mixture. Any water soluble silicate may be used, with sodium silicate being preferred. In some embodiments, advantages might be attained by including two or more water soluble silicate in the mixture. The inventors have found that a reduction of about 20% of the water soluble silicate compared to that of U.S. Pat. No. 5,718,857 is achievable in the present invention, without loss of beneficial properties.

To a certain extent, the amount of water incorporated in the mixture will depend upon the manner in which the shaped article is to be formed. An amount of water equivalent to between about 1 and 10% by weight of the aluminosilicate containing material will usually be sufficient in forming the majority of shaped articles. As the majority of the mixture (i.e. the particulate waste material) is provided in dry form, the mixture will always require the addition of significant quantities of water (the components used in U.S. Pat. No. 5,718,857 were often provided as a slurry, meaning that no additional water was required). As would be appreciated, this is especially advantageous when the water is also a by-product of the facility that produced the waste particles.

In some embodiments, the order of addition of the components into the mixture may affect the nature of the resultant shaped article. Routine trials and experiments, based on the teachings contained herein, will be able to ascertain if this is the case for a particular composition/shaped article and, if so, the most appropriate methodology.

Once appropriately mixed, the mixture is made into a shape which, once cured, will have the shape of the shaped article. Any suitable method or apparatus for shaping the mixture may be used. In some embodiments, for example, shaping the mixture may comprise compaction, moulding, extrusion or slip forming of the mixture (i.e. the shaper in the apparatus is configured to compact, mould, extrude or slip form the mixture). The method chosen will be largely determined by the composition of the mixture and the nature of the finished shaped article.

Once appropriately shaped, the shaped mixture is cured in order to produce the shaped article. Curing the shaped mixture may involve heating the shaped mixture to a temperature and for a time effective to produce the shaped article. Typically, curing comprises heating the shaped mixture to a temperature (e.g. from about 20° C. to about 60° C.) and for a time (up to about 7 days, at relatively low temperatures) effective to produce the shaped article. It has, however, been found that it is possible to substantially accelerate the curing time by increasing the curing temperature, for example, by curing at 100° C. in a confined environment. As noted above, the presence of carbon dioxide during curing (e.g. from the flue gas) may also help to accelerate the process.

In some embodiments, however, it may not be necessary to heat the shaped mixture, and they can cure at ambient temperatures (albeit over a longer time). Indeed, as the chemical processes which result in the formation of the shaped articles are exothermic, the heat generated by the mixture during curing might, in some embodiments, be sufficient. The strength of the shaped articles will continue to increase over time, and the pH should not drop (as happens with Portland cement, which limits the life expectancy of products containing Portland cement). As would be appreciated, if no heating is required to form the shaped articles of the invention, then this will compare favourably with the relatively high energy requirements required to form conventional clay bricks and tiles. Such relatively low energy requirements of the invention may contribute to the relatively low cost of production of these shaped articles.

The curer in the apparatus may be configured to heat the shaped mixture to a temperature and for a time effective to produce the shaped article. As noted above, in some embodiments, the apparatus may include ducting which directs heated gas (e.g. from the pneumatic conveyor) from the inlet into the curer.

In some embodiments, the mixture (and hence the shaped article) may consist only of the waste material the metal oxide, the alkali, the water soluble silicate and water. Advantageously, the shaped articles of the present invention do not need to contain any Portland cement, and thereby avoid some of the issues associated with concretes containing Portland cement (e.g. a susceptibility to acid and salt attack, etc.).

As described above, however, in some embodiments, additional additives such as appropriately graded gravel, sand, pigments and calcined soils may also be added to the mixture. Usually, such additives will be included to produce shaped articles having a particularly desired texture, colour, appearance or other characteristic. These additives may be added to the mixer at the same time as the waste material etc., or at a different time, depending on the nature of the final shaped article. It is within the ability of a person skilled in the art to determine whether an additional additive may be necessary or desirable and, if so, at what stage of the process it should be added.

In some embodiments, aggregate or an aggregate-like materials (e.g. shaped articles having an aggregate-like size and produced in an earlier application of the present invention) may be added to the mixture, with the resultant produced shaped article taking the form of a concrete-like article.

In some embodiments, the mixture may further comprise washery tailings, which are rich in carbonaceous materials and hence have potential for use as fertilizers, ground conditioners or the like, and especially if combined with a source of nitrogen (e.g. urea) or phosphorous (e.g. superphosphate). Such uses for washery tailings have not previously been realised because of the difficulty of providing washery tailings in a form that is capable of being easily distributed in agricultural applications. The inventors have found that washery tailings (up to 50% by weight) can be incorporated into the mixture of the present invention, and that shaped articles in the form of pellets can be produced having a moisture content that enables the pellets to be flowable (superphosphate and urea prills tend to absorb moisture quickly and form clumps, especially on storage in the presence of relatively moist particles such as grain).

Such pellets have a relatively high carbon content and properties not dissimilar to that of biochar, making them especially suitable for mixing with phosphate or urea prills for use as fertilizers. The pellets may have a size similar to that of a seed grain, such that they could be stored and sowed with seed, which would provide a number of advantages in the cultivation of crops.

Shaped articles produced in accordance with the present invention can have numerous advantageous properties. For example, shaped articles of the present invention have been found to have comparable (if not superior) structural strength (both compressive and transverse), durability, weight and resistance to salt and acid attack than that of comparable shaped articles formed from conventional materials. The shaped articles of the present invention also have an improved fire rating and can have better acoustic qualities and thermal ratings.

Further, due to the synergies described above, and because the present invention is typically carried out in close proximity to the source of the waste material, it is possible to produce shaped articles in accordance with the present invention using a fraction of the energy required to produce bricks, tiles, building blocks etc. using conventional means. To take but one example, the energy required to form construction blocks in accordance with the present invention has been found by the inventors to be as low as 1.5% of the energy required to form conventional concrete blocks. It is also noted that production of shaped articles in accordance with the present invention does not result in the generation of carbon dioxide, which is certainly not the case for the production of materials containing Portland cement.

Furthermore, given that the cost of fly ash and like materials is virtually nil and the cost of other ingredients in the mixture is relatively low (and even lower than was the case previously due to the enhanced reactivity of the waste material), it will be appreciated that the cost of production of the shaped articles of the invention will also be relatively low. The present inventors have found that the cost of producing shaped articles in accordance with the present invention can be up to 75% lower than that of articles produced by conventional techniques.

Figure 1:
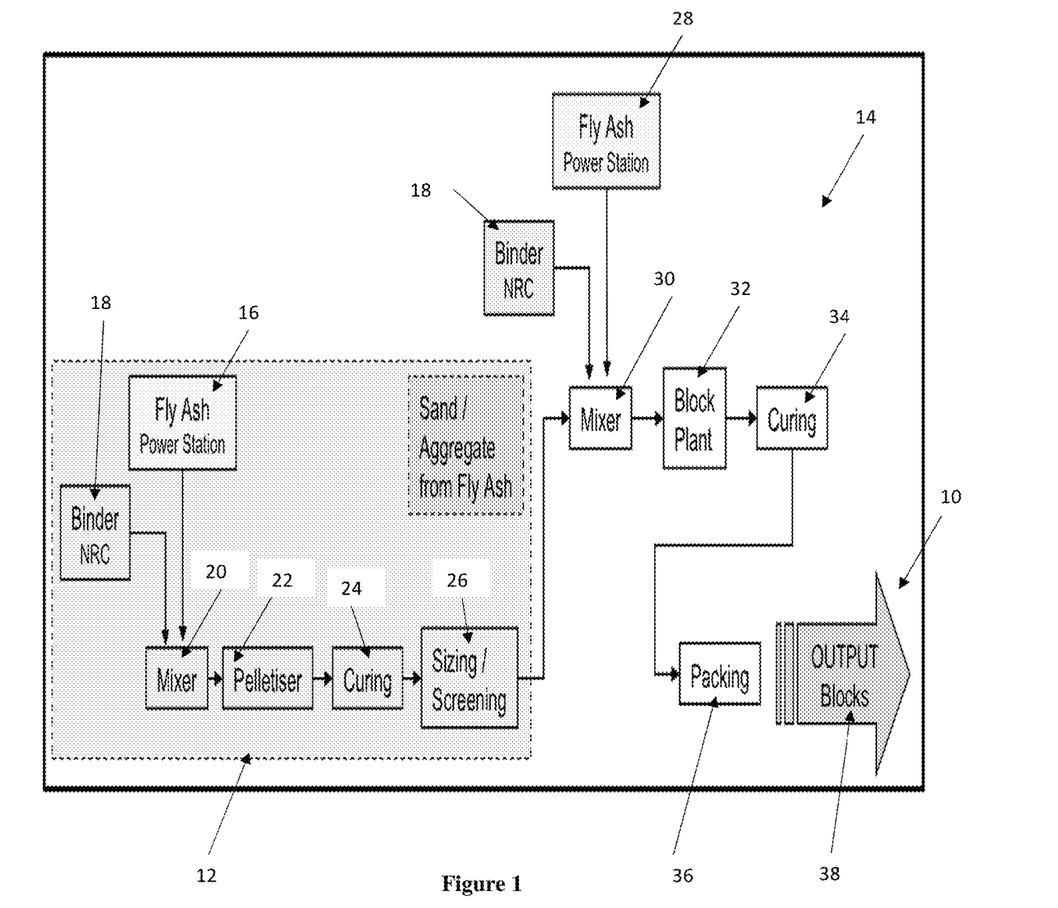
FIG. 1 shows a flowchart for the production of a shaped article in the form of a block in accordance with an embodiment of the present invention.

Specific embodiments of the present invention will now be described, by way of example only. Referring firstly to FIG. 1, a flowchart for the production of a shaped article in the form of a block in accordance with an embodiment of the present invention is shown. The resultant blocks 10 produced by the process include an aggregate material formed from fly ash in a preliminary process 12 in accordance with a first embodiment of the present invention and a cementitious matrix (i.e. incorporating the aggregate) formed from fly ash in a secondary process 14 in accordance with a second embodiment of the present invention.

In preliminary process 12, hot fly ash 16 is obtained from a power station and mixed with an appropriate amount of a metal oxide, an alkali, a water soluble silicate and water 18 in mixer 20. Once appropriately mixed, the mixture is transferred to a pelletiser 22, where shaped articles in the form of pellets are produced. The pellets are then transferred to a curer 24, where they are cured, with the cured pellets being screened in a screener 26 to ensure they are of a substantially homogeneous particle size. The thus formed pellets are of a size appropriate for use an aggregate material in a building block. The pellets are, however, significantly lighter than more traditional aggregates (e.g. pebbles or blue metal).

In subsequent process 14, more fresh and hot fly ash 28 is obtained from the power station and mixed with an appropriate amount of a metal oxide, an alkali, a water soluble silicate and water 18 in mixer 30. The cured pellets formed in preliminary process 12 are also added to the mixer 30, where they bulk out the mixture and provide the properties and characteristics of a typical aggregate material. Once appropriately mixed, the mixture is transferred to a block forming plant 32, where shaped articles in the form of blocks are produced from the flowable mixture. The blocks are then transferred to a curer 34, where they are cured. Once cured, the blocks 10 are packed 36 and shipped 38 to their intended destination (e.g. a construction site, not shown). Blocks 10 produced in accordance with this embodiment have been found to be significantly lighter than comparable blocks produced using Portland cement and more traditional components, but have a compressive strength of up to about 25 MPa.

The inventors have found that similar processes can be followed in order to produce bricks or pavers having compressive strengths of up to 50-100 MPa.

Figure 2:
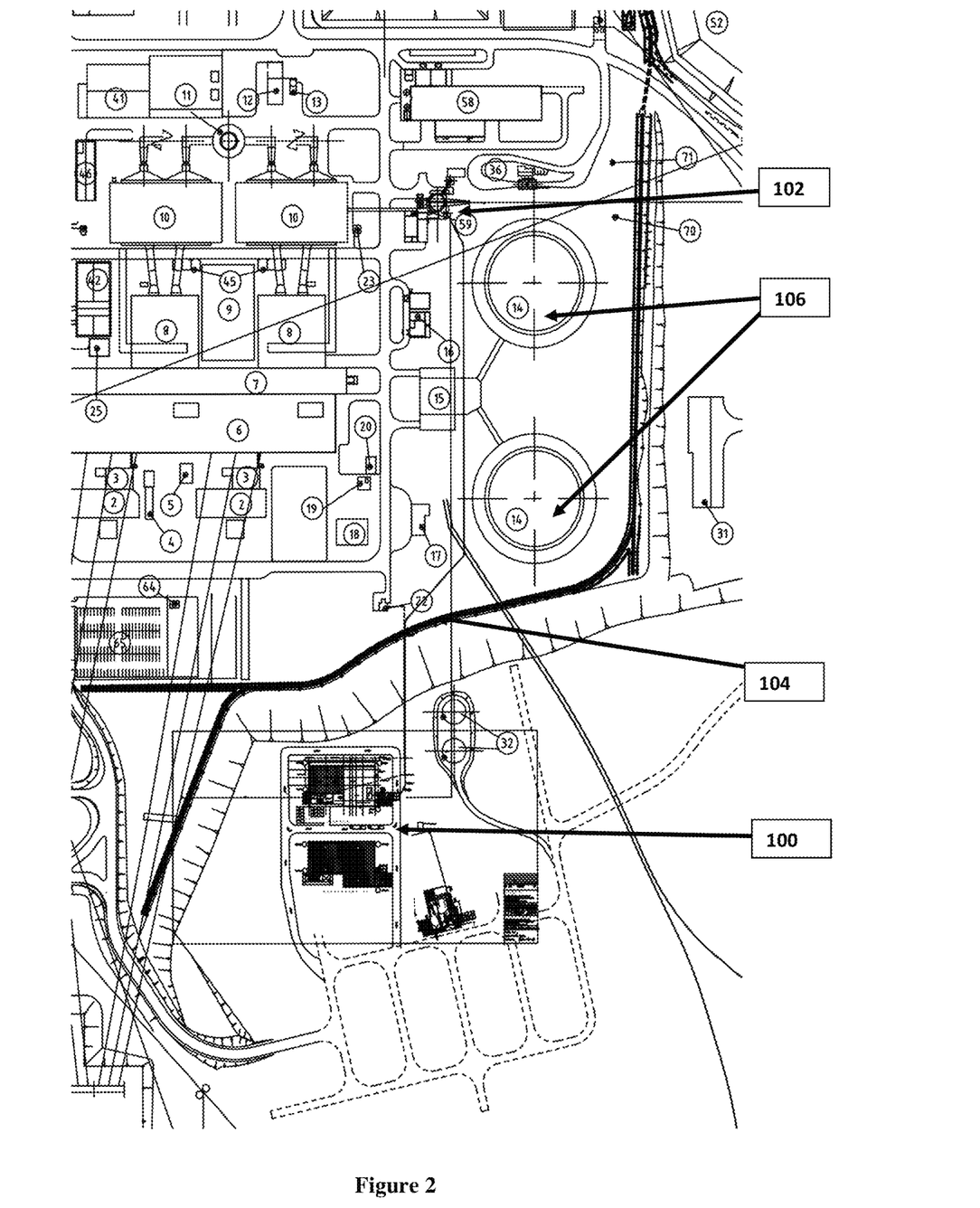
FIG. 2 shows a plan of a power plant having an apparatus in accordance with an embodiment of the present invention located in close proximity.

Referring now to FIG. 2, a plan of a power plant having an apparatus in accordance with an embodiment of the present invention located in close proximity is shown. In FIG. 2, the apparatus in accordance with an embodiment of the present invention is shown in the form of apparatus 100 which is located on the same site as the power plant. The power plant's reject ash silo is shown at 102, and this is where the hot flue gas and entrained fly ash is transferred to immediately after it is produced. The hot fly ash in the reject ash silo 102 is immediately conveyed to the apparatus 100 via a pneumatic conveyor depicted as line 104, a distance of about 400 m. Cooling towers 106, 106 are shown to give an idea of the scale of the plan.

EXAMPLES

Comparative Experiments

For comparative purposes and to illustrate some of the advantageous properties of the present invention, a number of experiments have been carried out by the inventors. In the first of these experiments, run of station fly ash was obtained from a power plant and was mixed with iron oxide, sodium hydroxide, sodium silicate and water in the proportions shown in Table 1 below. In a first series of experiments, the process described in U.S. Pat. No. 5,718,857 was used, where the fly ash mixed with the other components had been allowed to cool to room temperature before mixing. In the second series of experiments, which were in accordance with an embodiment of the present invention and are marked with asterisks in Table 1, the fly ash was not allowed to cool to room temperature, but was immediately mixed with the other components.

As can be seen, the amounts of iron oxide, sodium hydroxide and sodium silicate required in the examples in accordance with the present invention are much less than those required for the examples including the same fly ash, but which had cooled before mixing. The compressive strengths of the resultant shaped articles are also significantly higher for the examples in accordance with the present invention. Furthermore, the inventors also noted that shaped articles produced in the examples in accordance with the present invention did not exhibit any shrinkage or cracking, and remained dimensionally stable during curing, which was not the case for some of the other shaped articles (which exhibited some minor surface cracking).

Examples 1 and 2 demonstrate that the process described in U.S. Pat. No. 5,718,857 would not always yield products having consistent properties, with curing time being dependent on factors such as the water content of the components. The present invention, however, can enable more precise control over such factors, resulting in the production of shaped articles having more consistent properties.

TABLE 1

Composition and properties of shaped articles produced using cooled fly ash or warm fly ash (i.e. in accordance with an embodiment of the present invention), the latter being marked with an asterisk.

| Example No. | Percentage by weight relative to feedstock material | | | | Compressive strength (MPa) | |
| --- | --- | --- | --- | --- | --- | --- |
| | Iron oxide | NaOH | Sodium Silicate | Water content | 7 days | 28 days |
| 1 | 5 | 2.5 | 5 | 10 | 13 | 14 |
| 1* | 1 | 1 | 3 | 5 | 20 | 33 |
| 2 | 5 | 2.5 | 5 | 10 | 13 | 18 |
| 2* | 0.5 | 0.75 | 3 | 5 | 12 | 25 |
| 3 | 5 | 2.5 | 10 | 18 | 30 | 44 |
| 3* | 2 | 1.5 | 5 | 5 | 32 | 48 |
| 4 | 5 | 2.5 | 10 | 17 | 14 | 28 |
| 4* | 1 | 1 | 4 | 6 | 24 | 41 |

Various Particulate Waste Materials

Other shaped articles in accordance with embodiments of the present invention were prepared using different types of freshly produced aluminosilicate-containing particulate waste material. The compositions used to form these shaped articles and their resultant compressive strengths are shown in Table 2, below. The red mud particulate waste material of Examples 13 and 14 includes a significant proportion of iron oxide, hence it was not necessary to add additional iron oxide to the mixture in those samples. Similarly, the iron ore fines are highly alkaline, hence it was not necessary to add additional iron oxide or alkali (sodium hydroxide) to the mixture in those samples.

As will be appreciated, the compressive strengths of the shaped articles produced in accordance with embodiments of the present invention compare very favourably with those of traditional construction blocks.

TABLE 2

Composition and properties of shaped articles produced using various freshly produced aluminosilicate-containing particulate waste materials.

| Example No. | Percentage by weight relative to feedstock material | | | | Compressive strength (MPa) | |
| --- | --- | --- | --- | --- | --- | --- |
| | Iron oxide | NaOH | Sodium Silicate | Water content | 7 days | 28 days |
| Steel Blast Furnace Slag 85% & Run of Station Ash 15% | | | | | | |
| 5 | 0.5 | 0.3 | 2 | 5 | 45 | 62 |
| 6 | 1 | 0.7 | 3 | 6 | 72 | 81 |
| Steel Slag 90% & Run of Station Ash 10% | | | | | | |
| 7 | 0.25 | 0.3 | 2 | 5 | 65 | 95 |
| 8 | 0.5 | 0.7 | 3 | 6 | 72 | 103 |
| Lead Slag 90% & Run of Station Ash 10% | | | | | | |
| 9 | 0.25 | 0.3 | 2 | 5 | 59 | 80 |
| 10 | 0.5 | 0.7 | 3 | 6 | 65 | 95 |
| Copper Slag 75% and Run of Station Fly Ash 25% | | | | | | |
| 11 | 0.25 | 0.3 | 2 | 5 | 23 | 40 |
| 12 | 0.5 | 0.7 | 3 | 6 | 37 | 51 |
| Alumina Red Mud 50% and Run of Station Ash 50% | | | | | | |
| 13 | 0 | 0.75 | 3 | 5 | 11 | 18 |
| 14 | 0 | 1.5 | 5 | 5 | 17 | 25 |

TABLE 2-continued

Composition and properties of shaped articles produced using various freshly produced aluminosilicate-containing particulate waste materials.

| Example No. | Percentage by weight relative to feedstock material | | | | Compressive strength (MPa) | |
| --- | --- | --- | --- | --- | --- | --- |
| | Iron oxide | NaOH | Sodium Silicate | Water content | 7 days | 28 days |
| Nickel Slag 85% and Run of Station Ash 15% | | | | | | |
| 15 | 0.25 | 0.3 | 2 | 5 | 65 | 95 |
| 16 | 0.5 | 0.7 | 3 | 6 | 72 | 103 |
| Iron Ore Fines from Mine | | | | | | |
| 17 | 0 | 0 | 0.3 | 2 | 21 | 30 |

Fertiliser Pellets

Other shaped articles in accordance with embodiments of the present invention were prepared using other types of freshly produced aluminosilicate-containing particulate waste material as well as a source of carbonaceous material (washery tailings in Example 18 and brown coal in Example 19). The shaped articles were provided in the form of a seed shaped product, which slowly breaks down over 12 months to release the carbonaceous material. The seed shaped product was not at all sticky and flowed well, even when stored in a moist environment and in intimate contact with grain. Sufficient quantities of iron oxide were present in the waste materials used to produce these shaped articles, noting that compressive strength is not a particularly important parameter for fertiliser pellets.

TABLE 3

Composition and properties of shaped articles produced using various freshly produced aluminosilicate-containing particulate waste materials and a carbonaceous material.

| Example No. | Percentage by weight relative to feedstock material | | | | Compressive strength (MPa) | |
| --- | --- | --- | --- | --- | --- | --- |
| | Iron oxide | NaOH | Sodium Silicate | Water content | 7 days | 28 days |
| Washery tailings 50% and run of station ash 45% + additives for soil nutrients 5% for use as a ground conditioner | | | | | | |
| 18 | 0 | 1 | 4 | 6 | 6 | |
| Victorian Brown Coal 90% and Laddel slag from steel mills + additives for soil nutrients 5% for use as a ground conditioner | | | | | | |
| 19 | 0 | 1 | 4 | 6 | 5 | |

It will be appreciated that the present invention provides a number of new and useful results and advantages over existing processes. For example, specific embodiments of the present invention may provide one or more of the following advantages:
- beneficial recycling of one or more waste products;
- shaped articles can be produced that have comparable or better properties than articles containing Portland cement;
- less reagents are required than is the case for existing processes; and
- as the reagents may be supplied in dry form water is required, which can be obtained from a source of waste water associated with the source of the freshly produced aluminosilicate-containing particulate waste material (e.g. brine from a power plant).

It will be understood to persons skilled in the art of the invention that many modifications may be made without departing from the spirit and scope of the invention. All such modifications are intended to fall within the scope of the following claims.

It will be also understood that while the preceding description refers to specific sequences of process steps, pieces of apparatus and equipment and their configuration to perform such processes in relation to particular gas compositions, operating pressures and temperatures, and so forth, such detail is provided for illustrative purposes only and is not intended to limit the scope of the present invention in any way.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A process for producing a shaped article, the process comprising:
   obtaining, an aluminosilicate-containing particulate waste material produced by a combustion process from a source of production of an aluminosilicate-containing particulate waste material;
   conveying the aluminosilicate-containing particulate waste material directly from the source of production to a site where mixing is performed, whereby a temperature of the aluminosilicate-containing particulate waste material does not fall to 25° C. or below;
   mixing the aluminosilicate-containing particulate waste material having the temperature of higher than 25° C. with a metal oxide, an alkali, a water soluble silicate and water to form a mixture;
   shaping the mixture; and
   curing the shaped mixture, whereby the shaped article is produced.

2. The process of claim 1, wherein the waste material is pneumatically conveyed directly from the source of production of the waste material to the site where the mixing is performed.

3. The process of claim 1, wherein the waste material is conveyed to the site where the mixing is performed, and heating during the conveyance of the waste material to the mixing site slows down a rate of cooling of the waste material.

4. The process of claim 1, wherein a gas is used to pneumatically convey the waste material to the site where the mixing.

5. The process of claim 1, wherein the source of production of the waste material is a coal-fired power station, a steel mill, a non-ferrous metal smelter, an alumina plant, an incinerator or a biogenerator.

6. The process of claim 1, wherein the process is conducted within 1,000 m of the source of production of the waste material.

7. The process of claim 1, wherein the waste material is selected from one or more of the following: power station ashes; coal-fired power station ashes, including run of station ash, fly ash and bottom ash; steel mill wastes; non-ferrous metal smelter wastes; red mud from alumina plants; incinerator ashes; and ashes from biogeneration foundries and boilers.

8. The process of claim 1, wherein the waste material consists of different particle sizes.

9. The process of claim 1, wherein the metal oxide is iron oxide.

10. The process of claim 1, wherein the alkali is sodium hydroxide or potassium hydroxide.

11. The process of claim 1, wherein the water soluble silicate is sodium silicate.

12. The process of claim 1, wherein the waste material comprises one or more of the metal oxide, the alkali and water soluble silicate.

13. The process of claim 1, wherein the water is obtained from the source of production of the waste material.

14. The process of claim 1, wherein the water is brine.

15. The process of claim 1, wherein the shaped article is a building brick, a masonry brick, a tile or a paver.

16. The process of claim 1, wherein the mixture consists only of the waste material, the metal oxide, the alkali, the water soluble silicate and water.

17. The process of claim 1, wherein the mixture further comprises washery tailings and the shaped article is provided in a form of pellets.

18. The process of claim 1 wherein the waste material is introduced into the mixture above the temperature of about 30° C.

19. The process of claim 18 wherein the waste material is introduced into the mixture above the temperature of about 35° C.

20. The process of claim 19 wherein the waste material is introduced into the mixture above the temperature of about 40° C.

21. The process of claim 20 wherein the waste material is introduced into the mixture above the temperature of about 45° C.

22. The process of claim 20 wherein the waste material is introduced into the mixture above the temperature of about 50° C.

* * * * *